(12) United States Patent
Rosasco

(10) Patent No.: US 9,412,193 B2
(45) Date of Patent: Aug. 9, 2016

(54) RUN-TIME OPTIMIZED SHADER PROGRAM

(75) Inventor: John D. Rosasco, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 724 days.

(21) Appl. No.: 13/151,174

(22) Filed: Jun. 1, 2011

(65) Prior Publication Data

US 2012/0306877 A1 Dec. 6, 2012

(51) Int. Cl.
*G06T 15/00* (2011.01)
*G06F 9/455* (2006.01)

(52) U.S. Cl.
CPC .......... *G06T 15/005* (2013.01); *G06F 9/45516* (2013.01)

(58) Field of Classification Search
CPC ....... G05T 15/00; G05T 15/80; G06T 15/005; G06F 8/443; G06F 8/4432–8/4452
USPC ........... 345/426, 522; 717/124–127, 140–161
See application file for complete search history.

(56) References Cited

U.S. PATENT DOCUMENTS

| | | | | |
|---|---|---|---|---|
| 5,630,157 | A * | 5/1997 | Dwyer, III | G06F 9/30072 712/214 |
| 6,427,234 | B1 * | 7/2002 | Chambers et al. | 717/140 |
| 7,015,909 | B1 * | 3/2006 | Morgan, III et al. | 345/426 |
| 7,324,106 | B1 * | 1/2008 | Cabral et al. | 345/426 |
| 7,692,660 | B2 * | 4/2010 | Markovic et al. | 345/522 |
| 7,750,913 | B1 * | 7/2010 | Parenteau | G06F 8/30 345/426 |
| 2003/0028860 | A1 * | 2/2003 | Sumida et al. | 717/125 |
| 2004/0207622 | A1 * | 10/2004 | Deering | G06T 15/50 345/426 |
| 2006/0082577 | A1 * | 4/2006 | Carter | 345/426 |
| 2006/0150161 | A1 * | 7/2006 | Onder | 717/127 |
| 2009/0189897 | A1 * | 7/2009 | Abbas | 345/426 |
| 2011/0032258 | A1 | 2/2011 | Dongmei et al. | |
| 2011/0138373 | A1 * | 6/2011 | Lane et al. | 717/157 |

OTHER PUBLICATIONS

T. Suganuma, T. Ogasawara, M. Takeuchi, T. Yasue, M. Kawahito, K. Ishizaki, H. Komatsu, T. Nakatani, Overview of the IBM Java Just-in-Time Compiler, 2000, IBM Systems Journal, 39(1):175-193, DOI: 10.1147/sj.391.0175.*
Minhaj Ahmad Khan, Feedback-directed specialization of code, 2010, Computer Languages, Systems & Structures, 36(2010): 2-15.*
Kekoa Proudfoot, William R. Mark, Svetoslav Tzvetkovy, Pat Hanrahan, A Real-Time Procedural Shading System for Programmable Graphics Hardware, 2001, Proceedings of the 28th annual conference on Computer graphics and interactive techniques Siggraph 2001, pp. 159-170.*
Qing Yi, R Clint Whaley, Automated transformation for performance-critical kernels, 2007, Proceedings of the 2007 Symposium on Library-Centric Software Design LCSD '07, pp. 109-119.*

(Continued)

*Primary Examiner* — Michael J Cobb
(74) *Attorney, Agent, or Firm* — Blank Rome LLP

(57) ABSTRACT

Systems, methods, and computer readable media for generating optimized shader programs (e.g., vertex and fragment) at run-time are described. In general, techniques are disclosed for determining when an executing graphics program (a "client") issues a command that, to be carried out, would require a significant change in the currently executing shader program (a "shader"). When this is detected, the client's specified change may be used to identify a minimal set of shader instructions that can provide the client's designated effect. The instructions so identified, may be used to generate a shader optimized for that effect.

20 Claims, 5 Drawing Sheets

(56) References Cited

OTHER PUBLICATIONS

Jonathan Ragan-Kelley, Charlie Kilpatrick, Brian W. Smith, Doug Epps, Paul Green, Christophe Hery, Fredo Durand, The Lightspeed Automatic Interactive Lighting Preview System 2007, ACM Transactions on Graphics (TOG)—Proceedings of ACM Siggraph 2007, Article No. 25.*

Fabio Pellacini, User-Configurable Automatic Shader Simplification, 2005, ACM Transactions on Graphics (TOG)—Proceedings of ACM Siggraph 2005, 24(3):445-452.*

Allen Sherrod, Game Graphic Programming—High Level Shaders, 2008, Course Technology, Boston MA, ISBN-13:978-1-58450-516-7, pp. 183-184.*

* cited by examiner

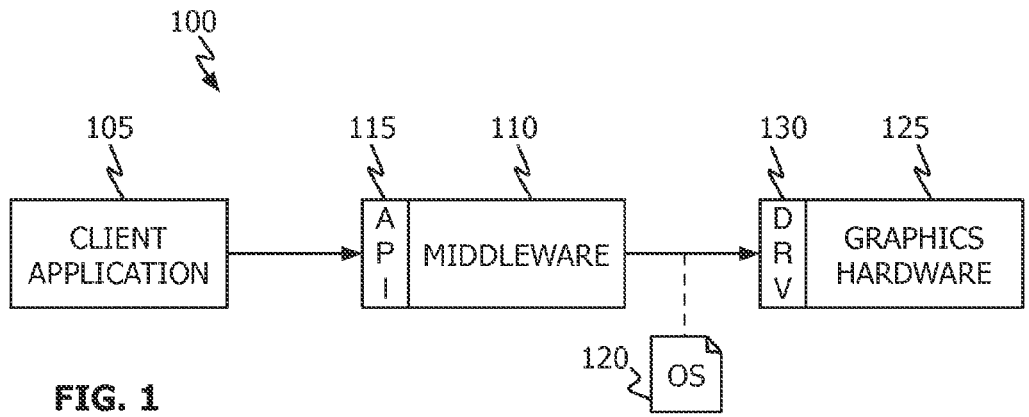
FIG. 1
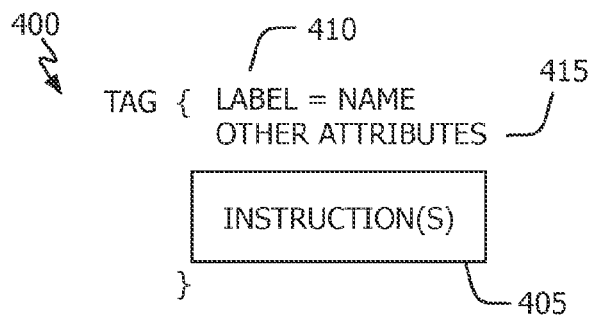
FIG. 4A
FIG. 4B

RUN-TIME OPTIMIZED SHADER PROGRAM

BACKGROUND

This disclosure relates generally to the field of graphics processing. More particularly, this disclosure relates to techniques for identifying and generating optimized shader programs for executing applications.

In computer graphics, it is common to represent objects as triangulated polygons (i.e., triangles). The vertices of triangles may be associated not only with position (i.e., where in/on an object the vertex resides), but also with other attributes that may be used to properly render the triangle to which the vertex is a part. Such attributes may include color at the vertex point, reflectance of the surface at the vertex, textures of the surface at the vertex, and the normal of an approximated curved surface at the location of the vertex. In practice, a vertex may be thought of as a data structure that describes a point in two-dimensional (2D) or three-dimensional (3D) space. A collection of vertices (representing triangles), and information about their interconnectivity, may be used to model objects.

Modern graphics processing units (GPUs) have generalized architectures that permit customized programming through the use of "shader" programs. A shader program is a set of instructions that may be used to calculate rendering effects. In general, there are two principal types of shader programs: vertex shader programs and fragment shader programs. Vertex shader programs are run once for each vertex in a model and are responsible for how the vertex will be displayed. Fragment shader programs are run once for every pixel in every triangle in a model/object and are responsible for how individual pixels will be displayed. Vertex shader programs can manipulate properties such as the position, color, texture coordinates, and lighting characteristics of a vertex. Fragment shader programs can manipulate various attributes of individual pixels such as color and translucency characteristics. Fragment shaders may also be used to apply lighting values, shadows and specular highlights to a displayed object.

For model data to faithfully represent an object, often many thousands of vertices are required. To produce animation it may be desirable to have rendering rates of 60 frames per second (FPS). Consider then a model that has 100,000 vertices. If the desired drawing rate for the object represented by the model is 60 FPS, a vertex shader program would need to be executed six million (6,000,000) times per second.

Modern framebuffers (to which GPUs write their output), are composed of millions of elements (each element representing a pixel). Often each final frame of GPU rendering will be the result of compositing multiple fragments (i.e., pixels) with a blending operation between them. Consider then a framebuffer that is 2,000-by-1,000 elements in size. If each pixel is drawn twice (once to render the pixel and another to perform a blending operation), a fragment shader program would need to be executed four million (4,000,000) times per second for each frame. At a rendering rate of 60 FPS, the fragment shader program would need to be executed two hundred forty million (240,000,000) times per second.

Because of the extremely high number of executions for both vertex and fragment shaders during object rendering operations, it is important to be able to use optimized shader programs. Unlike programs written for general purpose central processing units (CPUs), generalized logic that employs conditional instructions for potentially unused instructions is not acceptable (such instructions take to much time to evaluate at the rates presented above). Thus, it would be beneficial to provide a technique to generate optimized shaders for an executing application at run-time.

SUMMARY

In one embodiment the invention provides a method to generate optimized shader programs. The method includes receiving a designated graphics effect from a client application at run-time, automatically identifying one or more shader program source instructions based on the designated graphics effect and automatically compiling the identified instructions to generate a shader program optimized for the designated graphics effect. Once compiled, the optimized shader program may be linked on behalf of the client application and executed by a programmable graphics processing unit.

In another embodiment the designated graphics effect may be used to generate a unique identifier. The unique identifier, in turn, may be used to isolate and select only those shader program source instructions needed to satisfy the designated graphics operation. The unique identifier may also be used to store the optimized shader program for reuse at a later time. In yet another embodiment, the unique identifier may be used (once generated and before being used to isolate and select shader program instructions) to determine if a shader optimized for the designated graphics operation has already been generated. For example, by using the unique identifier as a hash or key into a memory cache.

In still another embodiment an optimized shader may be retrieved from memory, or generated as described herein, only if the designated graphics operation would require a substantial change in a shader program already executing. In another embodiment, the unique identifier may be used as a mask to selectively identify only those instructions from a plurality of shader program source instructions, needed to implement the designated shader operation. The plurality of shader program source instructions may be instructions making up a monolithic shader program (e.g., a vertex or fragment shader). In one embodiment, the monolithic shader program may be tagged such that groups of one or more shader program instructions correspond to various values of the unique identifier. Other embodiments of the described methodologies may be embodied as program code stored on a non-transitory storage device. Such program code may even be made part of a computer system.

BRIEF DESCRIPTION OF THE DRAWINGS

FIG. 1 shows, in block diagram form, a system in accordance with one embodiment.

FIGS. 4A and 4B show how functional blocks of statements within monolithic shader programs may be tagged in accordance with one embodiment.

DETAILED DESCRIPTION

Figure 2:
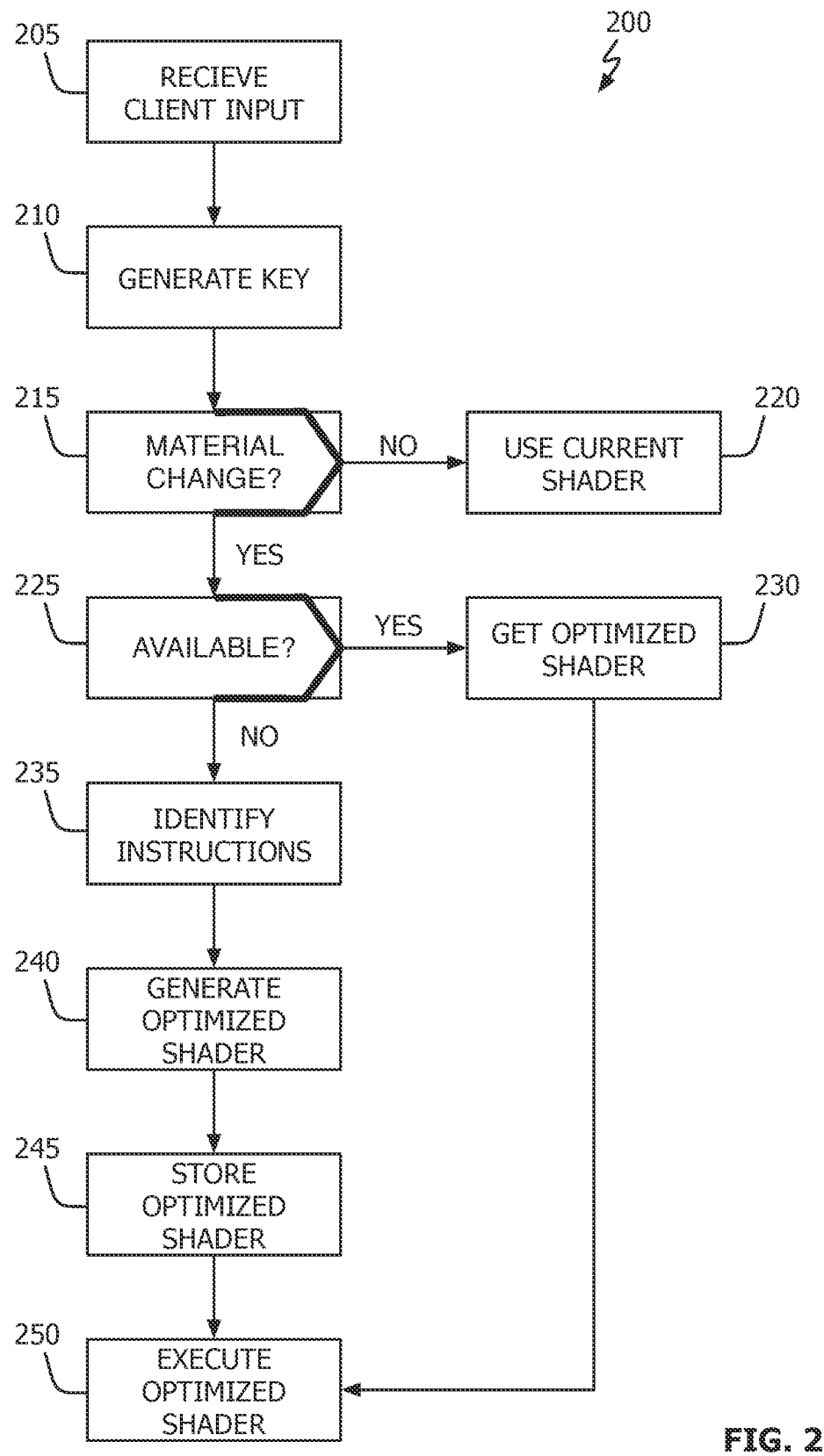
FIG. 2 shows, in flowchart form, an operation to generate optimized shaders in accordance with one embodiment.

This disclosure pertains to systems, methods, and computer readable media for generating optimized shader programs (e.g., vertex and fragment) at run-time. In general, techniques are disclosed herein for determining when an executing graphics program (hereinafter, client) issues a command that, to be carried out, would require a significant change in the currently executing shader program (hereinafter, shader). When this is detected, the client's specified change may be used to identify a minimal set of shader instructions that can provide the client's designated effect. The instructions so identified, may be used to generate a shader optimized for that effect.

In the following description, for purposes of explanation, numerous specific details are set forth in order to provide a thorough understanding of the inventive concept. As part of the this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the Graphics Processing Unit (GPU) program development field having the benefit of this disclosure.

Referring to FIG. 1, system 100 in accordance with one embodiment allows client 105 to designate specific graphics effects by issuing calls to middleware 110 (e.g., a library) through application programming interface (API) 115. At run-time, middleware 110 generates shader 120 optimized to perform the designated effect and passes it to graphics hardware 125 via drivers 130. By way of example only, middleware 110 and API 115 may support the OpenGL ES 1.1 and/or 2.0 standards.

When executing an individual shader four million (4,000,000) to two hundred forty million (240,000,000) times per second, each and every instruction within the shader becomes significant. For this reason, it has been determined that any shader that needs to operate at speeds such as these should be optimized. This means a shader should employ only those instructions needed to accomplish its specific task and include no looping or conditional statements.

When a fairly small number of specific tasks need to be implemented, they are typically hand-optimized. In the case of libraries or middleware implementations, the number of tasks can be so large that the development of hand-tailored shaders becomes impractical, if not impossible. Thus, in the past the only meaningful way to construct shaders (e.g., vertex and fragment) for these types of implementations has been to create monolithic shader programs. Monolithic shaders contain all of the instructions needed to implement all of the graphic operations that that type of shader is to provide. As a consequence, monolithic shaders make heavy use of conditional statements. To overcome the problem of conditional statements, shader programs as disclosed herein tag each functional block of one or more instructions within the source code of a monolithic shader. The tags may be used to relate or tie the instruction(s) within a block to a particular graphics state. At run-time, the tags may be used to identify only those instructions needed to provide the client's specified effect (i.e., without the use of conditional statements). The identified instructions, when compiled, constitute a shader optimized for the specified effect.

Referring to FIG. 2, operation 200 in accordance with one embodiment begins when client 105 calls into middleware 110 through API 115 designating a specific graphics effect (block 205). The specified effect may be used to generate a unique identifier or key (block 210). Each key so generated identifies, or corresponds to, a unique set of shader operations (a shader). Once generated, the key may be used to determine if the specified effect would require a significant change to the currently instantiated shader (block 215). As used herein, an operation will cause a "significant change" to a shader if the operation requires a change in the number or sequence of instructions the shader would need to execute to perform the operation. In a lighting effect, for example, changing the color of a light from blue to green would not constitute a significant change as both effects may be achieved by the same number and sequence of instructions (albeit with different input values). If, on the other hand, the number of lights provided by a lighting effect where to change from 1 to 3, to avoid the use of conditional statements in the shader, the number and sequence of instructions needed to supply 3 lights would be different from the number and sequence of instructions needed to supply 1 light. Such a change would be significant.

If the specified effect does not require a significant change to the currently instantiated shader (the "NO" prong of block 215), input in accordance with the specified effect may be supplied to the currently instantiated shader (block 220). As noted in the example above, one such change could be to change a lighting effect's color from blue to green. If the specified effect would require a significant change to the currently instantiated shader (the "YES" prong of block 215), a check may be made to determine if a shader corresponding to the key generated during block 210 is already available (block 225). If an optimized shader corresponding to the key is already available (the "YES" prong of block 225), that shader may be retrieved (block 230) and processed as discussed below (block 250). If a shader corresponding to the key does not already exist or is otherwise unavailable (the "NO" prong of block 225), the key may be used to identify one or more instructions from a collection of shader instructions such as, for example, a tagged monolithic shader (block 235) in accordance with this disclosure. The instructions so identified may be compiled (block 240), stored for later use (block 245), linked on behalf of client application 105 and sent for execution by graphics hardware 125 via drivers 130 (block 250). In one embodiment, compiled shader programs stored in accordance with block 245 may use the associated key as a hash value in a memory cache. In this way, acts in accordance with block 230 need only apply the key generated in accordance with block 210 to a memory cache to determine if a prior generated shader is available (e.g., during block 225). If a prior generated shader is available, the memory cache could, for example, return the compiled shader itself or a location in memory where the shader may be stored.

Figure 3:
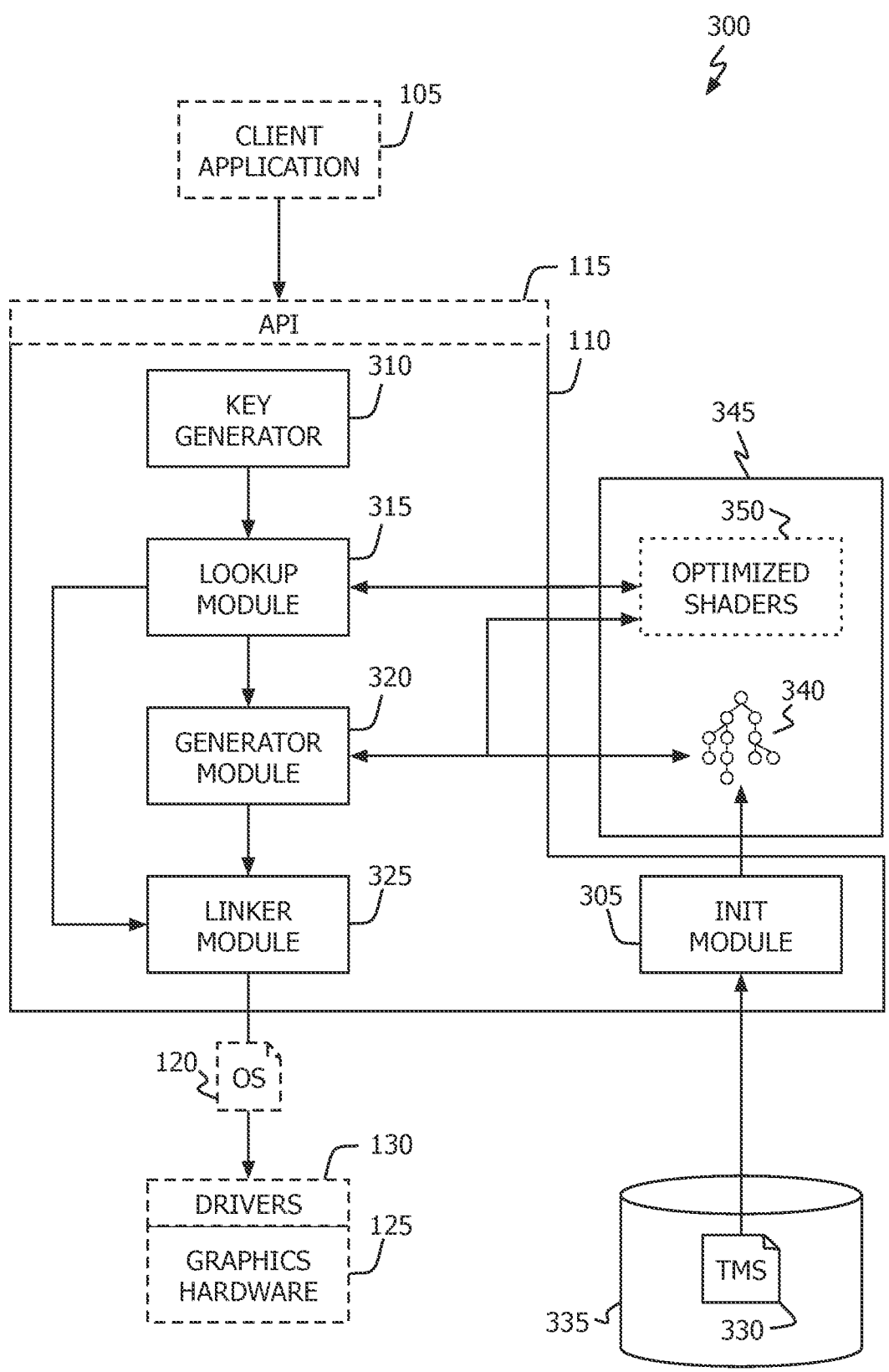
FIG. 3 shows, in block diagram form, a functional architecture for generating optimized shader programs at run-time in accordance with one embodiment.

Referring to FIG. 3, system 300 illustrates a functional architecture for generating optimized shader programs at run-time in accordance with one embodiment. As shown, middleware 110 includes initialization module 305, key generator module 310, lookup module 315, generator module 320, and linker module 325. Initialization module 305 retrieves tagged monolithic shader file 330 from storage 335, parses it into structure 340 suitable for use by generator module 320 and stores that structure in memory 345. Key generator module 310 uses client supplied effect information to generate a key that uniquely corresponds to the specific effect designated by client 105. Lookup module 315 uses the key to determine if an optimized shader corresponding to the key has already been generated and stored in memory 345 (e.g., in memory region 350). Generator module 320 uses the key and structure 340 stored in memory 345 to generate and compile a shader optimized for the effect designated by client 105. Generator module 320 may also store compiled shader programs in region 350 of memory 345 for later use (e.g., retrieval by lookup module 315). Linker module 325 links the compiled optimized shader on behalf of client application 105 and passes optimized shader 120 to graphics hardware 125 via drivers 130.

For embodiments in which middleware 110 and API 115 support a standard such as the OpenGL or OpenGL ES standards, extended mark-up language (XML) tags may be assigned to each functional block of one or more instructions within the source code of a monolithic shader. The tags may be used to relate or tie the instruction(s) within a block to a particular OpenGL state and the class object (in an object-oriented implementation) that handles the particular effect provided by the instruction(s). Referring to FIG. 4A, structure 400 represents a tagged functional block of instructions within a monolithic shader program in accordance with one embodiment. As shown, structure 400 includes one or more instructions 405, label 410 and attributes 415. It will be recognized, that block 405 may include other (nested) blocks of instructions. To see how label 410 and attributes 415 may be used to tie or associate instructions 405 to a particular OpenGL ES state as may be implemented in an object-oriented environment effect, consider FIG. 4B. As shown there, label 420 identifies instruction block 425 as being related to the texturing property for the class EFFECT (used, for example, to implement the OpenGL ES effect). Attributes 430 indicate the texturing property is conditional and handled by the class EFFECT. If the same instructions are used in the same sequence in multiple locations within file 330, a common tag may be applied to each such block.

Figure 5:
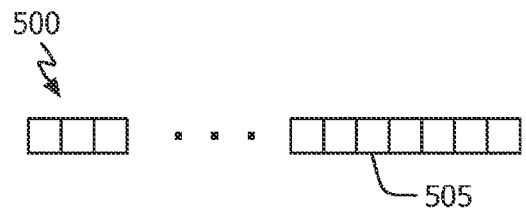
FIG. 5 shows a state vector in accordance with one embodiment.

Referring again to FIG. 3, at system start-up initialization module 305 retrieves monolithic shader program file 330 that has been tagged as described herein, parses it in accordance with those tags and stores the (hierarchical) structure 340 in memory 345. During this process, initialization module may also assign a unique value to each unique tag within file 330. As such, each assigned value relates to a single effect. In some embodiments, the "value" of each unique state (as represented my a unique label in file 330) may be "recorded" in a state vector, where each element in the state vector represents the state (i.e., on or off, enabled or disabled) corresponding to a tag in file 330/structure 340. Referring to FIG. 5, state vector 500 may include an element or bit value for each unique tag in file 330/structure 340. As shown here, element (e.g., bit) 505 in state vector 500 may represent the status of the "texturing enabled" tag 420 which, in turn, represents the status of the "texturing enabled" effect within system 100 and/or 300.

Figure 6:
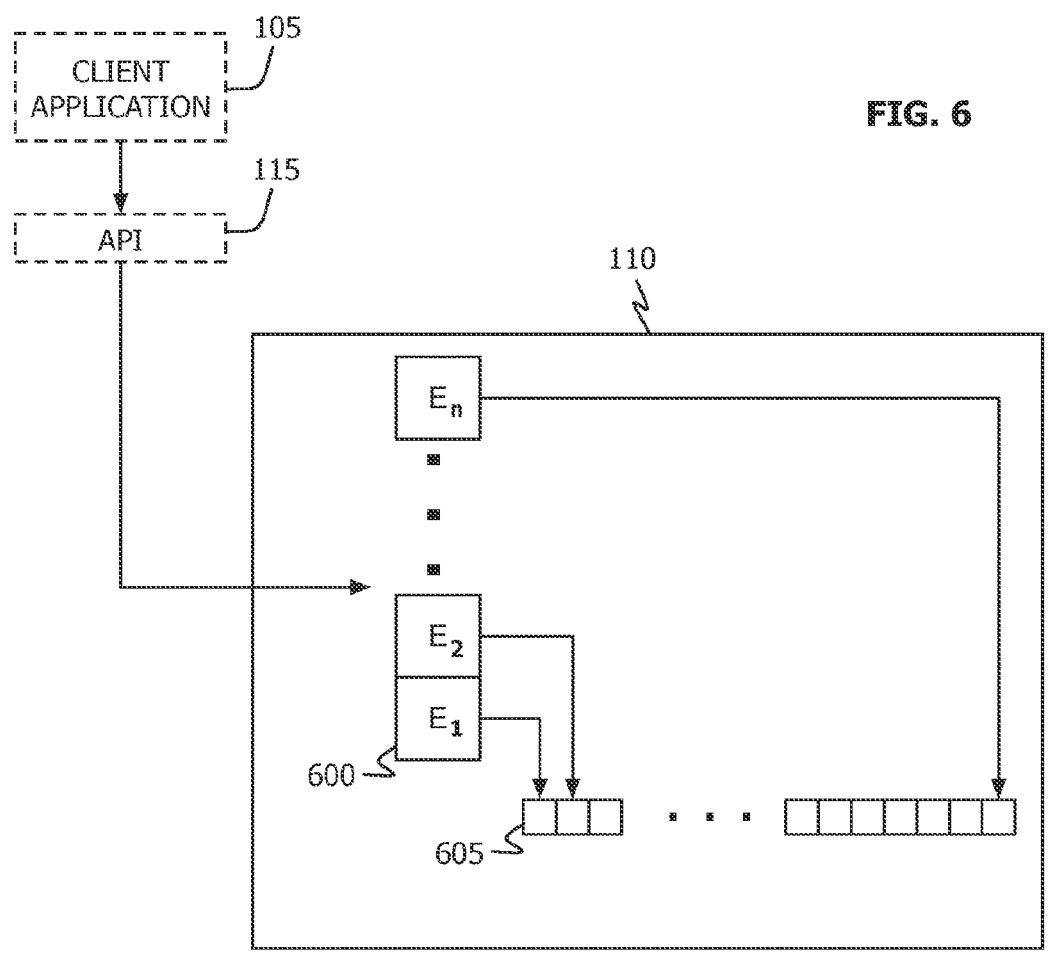
FIG. 6 shows a key generation operation in accordance with one embodiment.

Key generation in accordance with blocks 210 (FIG. 2) and module 310 (FIG. 3) for one embodiment is illustrated in FIG. 6. When client 105 calls into middleware 110 through API 115, it can result in one or more values being set within middleware 110. For example, within effect structure 600. Values within effect structure 600 may be mapped into input state vector 605. For those effects in structure 600 that have a corresponding tag in file 330/structure 340, input state vector 605 may have a corresponding element (e.g., bit). In one embodiment, input state vector 605 has the same number of elements as state vector 500 and the ith element in state vector 500 represents the same effect as does the ith element in input state vector 605. Because input state vector 605 uniquely represents the combination of effect values that client 105 may designate, it may also be thought of as a "key" (e.g., an input key).

In addition to generating input key 605, operations in accordance with block 310 may determine if the effect specified by client 105 (as expressed by input state vector 600) would significantly affect the currently executing shader program. In one embodiment, substantial changes to a shadier may be determined by modifier methods in the classes of the middleware (i.e., those classes used to implement an adopted graphics standard such as OpenGL). State vector 605 may then be thought of as a ledger to record these changes. If the specified effect would not necessitate a substantial change to the currently instantiated shader, operations continue as discussed above regarding block 215. If the client specified input state vector or key 605 indicates the currently executing shader would need to be significantly changed, key generator module 310 passes key 605 to lookup module 315.

Lookup module 315 may use input state vector 605 as a key into memory 345 to determine if a shader optimized for the specific effect represented by key 605 has already been generated. In one embodiment, key 605 may be used as input (e.g., a hash value) to a memory cache. If key 605 is "in" the memory cache, what can be returned is the optimized shader or the address in memory 345 where the optimized shader is stored (e.g., within region 350), whereafter operations continue as discussed above with respect to block 315. If no such shader is found to exist (or is otherwise unavailable), lookup module 315 may pass key 605 to generator module 320.

Generator module 320 may use key 605 as a mask against structure 340. In this operation, key 605 may be seen to mask out (or remove from further consideration) those functional blocks in file 330 that do not correspond to the effect represented by the unique pattern of bits in key 605. It may be recognized that these acts have the effect of removing unnecessary instructions from structure 340 (the monolithic shader). The approach of removing unnecessary instructions from a monolithic shader to generate an optimized shader, as opposed to building up an optimized shader by joining together different blocks of instructions, yields unexpected benefits. One such benefit is that of substantially reducing the problem caused by inter-related blocks of instructions. Another benefit of this approach is that the tagging process makes it such that the complex process of iteratively parceling chunks of shading text (e.g., shader source code) into logical blocks, tagging them, and associating them with logic that determines if the block should be included or not into a tractable problem. It thereby subdivides a very complex system interaction problem into a set of logical actions that are manageable.

Once the instructions (and only the instructions) needed to provide the client's designated effect have been identified, generator module 420 may compile them, store a copy thereof in memory 445 for later use (in accordance with key 605), and pass the compiled shader (which is now optimized for the specific effect designated by client 105) to linker module 325. Linker module 325 may, in turn, link the optimized shader to client 105 and send the compiled and linked optimized shader program to graphics hardware 125 through drivers 130 (in accordance with block 250). In an illustrative embodiment, the source code for a monolithic shader (e.g., a vertex or fragment shader) may include 200 to 400 lines. The same monolithic shader tagged in accordance with this disclosure may include 300 to 500 lines. Optimized shaders (e.g., shader 120) may include 1 to 5 instructions, none of which are conditional.

Figure 7:
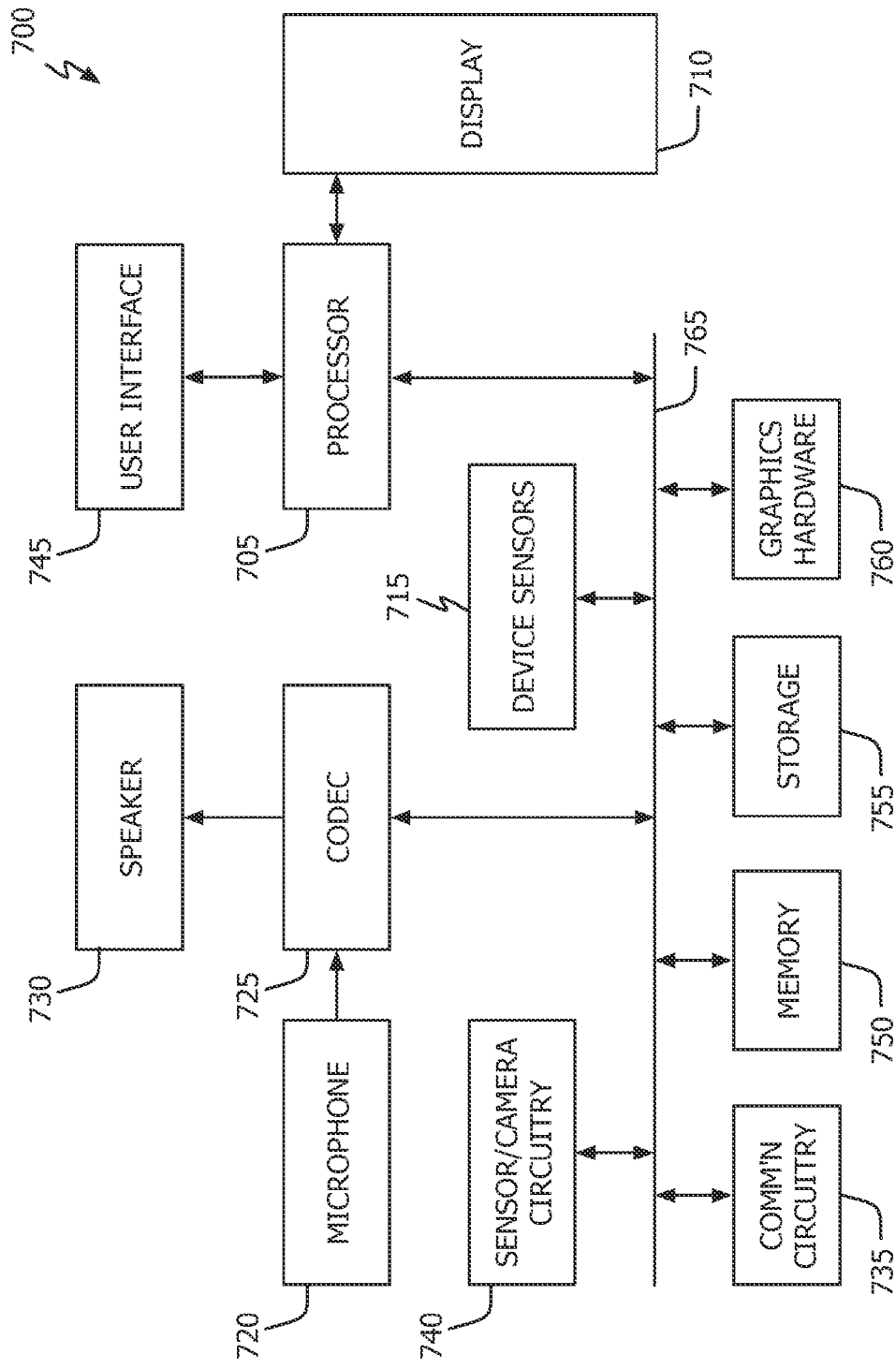
FIG. 7 shows, in block diagram form, an illustrative simplified functional diagram of an electronic device incorporating graphics processing capabilities as disclosed herein.

Referring now to FIG. 7, a simplified functional block diagram of electronic device 700 incorporating graphics processing capabilities as disclosed herein is shown according to one embodiment. Electronic device 700 may include processor 705, display 710, device sensors 715 (e.g., proximity sensor/ambient light sensor), microphone 720, audio/video codecs 725, speaker 730, communications circuitry 735, image sensor with associated camera hardware 740, user interface 745, memory 750, storage device 755, graphics hardware 760, and communications bus 765.

Processor 705 may be any suitable programmable control device(s) and may control the operation of many functions, such as the generation and/or processing of graphics data, as well as other functions performed by electronic device 700. Processor 705 may represent one or more processing units and include special purpose computational hardware. Processor 705 may also drive display 710 and receive user inputs from user interface 745. Processors such as the Intel Core® i5 and Intel Core® i7 processors or a Cortex® A8 with the ARM® v7-A architecture may provide a versatile and robust programmable control device that may be utilized for carrying out the disclosed techniques. (INTEL CORE is a registered trademark of the Intel Corporation. CORTEX and ARM are registered trademarks of the ARM Limited Company of the United Kingdom.) In one embodiment, electronic device 700 may be a workstation or desktop computer system. In another embodiment, electronic device may be portable such as a laptop computer, mobile phone, personal data assistant (PDA), portable digital camera or tablet computer.

Memory 750 may include one or more different types of storage media used by processor 705 to perform device functions. For example, memory 750 may include memory cache, read-only memory (ROM), and/or random access memory (RAM). Graphics hardware 760 may includes special purpose graphics hardware such as a programmable GPU. Communications bus 765 may provide a data transfer path for transferring data to, from, or between at least storage device 755, memory 750, processor 705, and graphics hardware 760. User interface 745 may allow a user to interact with electronic device 700. For example, user interface 745 can take a variety of forms, such as a button, keypad, dial, a click wheel, keyboard, display screen and/or a touch screen.

Storage device 755 may store media (e.g., image and video files), computer program instructions or software, preference information, device profile information, and any other suitable data. Storage device 755 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Memory 750 and storage 755 may be used to tangibly retain computer program instructions or code organized into one or more modules and written in any computer program language desired. When executed by, for example, processor 705 such computer program code may implement one or more of the methods described herein.

Various changes in the materials, components, circuit elements, as well as in the details of the illustrated operational methods are possible without departing from the scope of the following claims. For instance, processor 705 may be implemented using two or more program control devices communicatively coupled. Each program control device may include the above-cited processors, special purpose processors such as graphics processing units and custom designed state machines that may be embodied in a hardware device such as an application specific integrated circuits (ASICs) and field programmable gate array (FPGAs).

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to generate optimized shader programs at run-time, comprising:
   receiving a designated graphics effect from an application at run-time, the designated graphics effect being represented as a mask including a pattern of bits;
   determining a change in a number or a sequence of instructions of a currently instantiated shader program is needed to perform the designated graphics effect;
   in response to the determined need, determining whether an optimized shader program capable of performing the designated graphics effect is stored in memory;
   obtaining the optimized shader program from memory when the optimized shader program is determined to be in memory;
   preparing the optimized shader program when the optimized shader program is not stored in memory, the preparing of the optimized shader program including:
   automatically applying the mask to the currently instantiated shader program,
   removing shader program source instructions of the currently instantiated shader program that fail to correspond to the pattern of bits,
   designating unremoved shader program source instructions as one or more identified shader program source instructions, and
   automatically compiling only the one or more identified shader program source instructions to generate the optimized shader program; and
   executing the optimized shader program.

2. The method of claim 1, wherein the one or more identified shader program source instructions fail to include conditional statements for the designated graphics effect.

3. The method of claim 2, wherein the application of the mask to the shader program comprises applying the mask to a tagged representation of a monolithic shader program stored in memory.

4. The method of claim 1, further comprising storing the optimized shader program in memory.

5. The method of claim 4, wherein the storing of the optimized shader program in memory comprises storing the optimized shader program in memory based on the pattern of bits associated with the designated graphics effect.

6. The method of claim 1, wherein the execution of the optimized shader program comprises linking the optimized shader program to the application.

7. The method of claim 1, wherein the execution of the optimized shader program comprises sending the optimized shader program to a graphics processing unit.

8. A non-transitory program storage device to generate optimized shader programs at run-time, comprising program code to:

receive a designated graphics effect from an application at run-time, the designated graphics effect being represented as a mask including a pattern of bits;

determine a change in a number or a sequence of instructions of a currently instantiated shader program is needed to perform the designated graphics effect;

in response to the determined need, determine whether an optimized shader program capable of performing the designated graphics effect is stored in memory;

obtain the optimized shader program from memory when the optimized shader program is determined to be stored in memory;

prepare the optimized shader program when the optimized shader program is not stored in memory, wherein the program code to prepare the optimized shader program includes program code to:

apply the mask to the currently instantiated shader program, remove shader program source instructions of the currently instantiated shader program that fail to correspond to the pattern of bits, designate unremoved shader program source instructions as one or more identified shader program source instructions, and compile only the one or more identified shader program source instructions to generate the optimized shader program; and cause the optimized shader program to be executed.

9. The non-transitory program storage device of claim 8, wherein the one or more identified shader program source instructions fail to include conditional statements for the designated graphics effect.

10. The non-transitory program storage device of claim 9, wherein the program code to apply the mask to the shader program comprises program code to apply the mask to a tagged representation of a monolithic shader program stored in memory.

11. The non-transitory program storage device of claim 8, further comprising program code to store the optimized shader program in memory.

12. The non-transitory program storage device of claim 11, wherein the program code to store the optimized shader program in memory comprises program code to store the optimized shader program in memory based on the pattern of bits associated with the designated graphics effect.

13. The non-transitory program storage device of claim 8, wherein the program code to cause the optimized shader program to be executed comprises program code to cause the optimized shader program to be linked to the application.

14. The non-transitory program storage device of claim 8, wherein the program code to cause the optimized shader program to be executed comprises program code to send the optimized shader program to a graphics processing unit.

15. A system, comprising:
a programmable graphics processing unit;
memory operatively coupled to the programmable graphics processing unit; and
a processing unit operatively coupled to the programmable graphics processing unit and the memory, the processing unit being adapted to execute program code stored in the memory to:

receive a designated graphics effect from an application at run-time, the designated graphics effect being represented as a mask including a pattern of bits;

determine whether a change in a number or a sequence of instructions of a currently instantiated shader program is needed to perform the designated graphics effect;

in response to the determined need, determine whether an optimized shader program capable of performing the designated graphics effect is stored in the memory;

obtain the optimized shader program from the memory when the optimized shader program is determined to be in the memory;

prepare the optimized shader program when the optimized shader program is not stored in the memory, wherein the processing unit being adapted to execute program code stored in the memory to prepare the optimized shader program includes the processing unit being adapted to execute program code stored in the memory to:

apply the mask to the currently instantiated shader program, remove shader program source instructions of the currently instantiated shader program that fail to correspond to the pattern of bits designate unremoved shader program source instructions as one or more identified shader program source instructions, and compile only the one or more identified shader program source instructions to generate the optimized shader program; and cause the optimized shader program to be executed by the programmable graphics processing unit.

16. The system of claim 15, wherein the one or more identified shader program source instructions fail to include conditional statements for the designated graphics effect.

17. The system of claim 16, wherein the application of the mask to the shader program includes the processing unit being adapted to execute program code stored in the memory to:

apply the mask to a tagged representation of a monolithic shader program stored in the memory.

18. The system of claim 15, further comprising storing the optimized shader program in the memory.

19. The system of claim 18, wherein the storing of the optimized shader program in the memory comprises storing the optimized shader program in the memory based on the pattern of bits associated with the designated graphics effect.

20. The system of claim 15, wherein the execution of the optimized shader program comprises linking the optimized shader program to the application.

\* \* \* \* \*